United States Patent
Sasaki et al.

(10) Patent No.: US 9,312,932 B2
(45) Date of Patent: Apr. 12, 2016

(54) COMMUNICATION APPARATUS AND RESOURCE DERIVATION METHOD

(75) Inventors: Takahiro Sasaki, Tokyo (JP); Motoya Iwasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 486 days.

(21) Appl. No.: 13/702,442

(22) PCT Filed: Jun. 24, 2011

(86) PCT No.: PCT/JP2011/064560
§ 371 (c)(1),
(2), (4) Date: Dec. 6, 2012

(87) PCT Pub. No.: WO2012/005123
PCT Pub. Date: Jan. 12, 2012

(65) Prior Publication Data
US 2013/0077465 A1    Mar. 28, 2013

(30) Foreign Application Priority Data

Jul. 9, 2010 (JP) ................................. 2010-156915
Aug. 10, 2010 (JP) ................................. 2010-179449

(51) Int. Cl.
*H04B 7/04* (2006.01)
*H04L 1/18* (2006.01)
(Continued)

(52) U.S. Cl.
CPC ............ *H04B 7/0413* (2013.01); *H04L 1/1861* (2013.01); *H04L 5/0053* (2013.01);
(Continued)

(58) Field of Classification Search
CPC ...... H04B 7/04; H04B 7/0413; H04L 5/0053; H04L 5/0023; H04L 5/0055; H04L 5/0057; H04L 5/0094; H04L 1/1861; H04L 1/0073; H04L 1/0068; H04L 1/0025; H04L 1/1671; H04L 1/0072; H04L 1/0026; H04W 72/04; H04W 72/12; H04W 72/1294; H04W 72/1278; H04W 72/1289; H04W 72/1226; H04W 72/2636; H04W 52/243; H04W 52/244; H04W 52/241; H04W 52/24; H04W 52/242

USPC .................................................... 370/208, 328
See application file for complete search history.

(56) References Cited

U.S. PATENT DOCUMENTS 8,625,512 B2 * 1/2014 Futagi .................. H04L 1/0004
370/329
8,830,911 B2 * 9/2014 Ogawa .................. H04L 5/0023
370/328
(Continued)

FOREIGN PATENT DOCUMENTS

JP 2008263596 A 10/2008
JP 2009-522870 A 6/2009
(Continued)

OTHER PUBLICATIONS

3GPP TSG-RAN WG1 #61bis, "Resource Allocation for UCI on PUSCH", Jun. 28-Jul. 2, 2010, Ericsson, ST-Ericsson, 11 pages.*
(Continued)

Primary Examiner — Andrew Chriss
Assistant Examiner — Rasha Fayed
(74) Attorney, Agent, or Firm — Sughrue Mion, PLLC

(57) ABSTRACT

This invention is applied to a communication apparatus that uses one or more code words to transmit or receive appropriate information on a PUSCH. Assuming that the i-th code word CW_i is used alone to transmit the appropriate information, the communication apparatus of the invention uses a Formula (1) to calculate the number of resources Q'_i. When one or more code words are used to transmit the appropriate information, the communication apparatus uses a Formula (2) to calculate the number of resources Q'.

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad (1)$$

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH}\right) \quad (2)$$

14 Claims, 3 Drawing Sheets

(51) Int. Cl.
*H04L 1/00* (2006.01)
*H04L 5/00* (2006.01)
*H04L 1/12* (2006.01)
*H04W 72/04* (2009.01)

(52) U.S. Cl.
CPC ............. *H04L5/0055* (2013.01); *H04L 1/0073* (2013.01); *H04L 5/0023* (2013.01); *H04L 2001/125* (2013.01); *H04W 72/04* (2013.01)

(56) References Cited

U.S. PATENT DOCUMENTS

| | | | |
|---|---|---|---|
| 2011/0243103 A1* | 10/2011 | Kowalski | H04L 1/0031 370/336 |
| 2011/0299484 A1* | 12/2011 | Nam | H04L 1/0025 370/329 |
| 2011/0310855 A1* | 12/2011 | Yin | H04L 1/0067 370/336 |
| 2013/0028203 A1* | 1/2013 | Hooli | H04L 1/0026 370/329 |

FOREIGN PATENT DOCUMENTS

| | | |
|---|---|---|
| JP | 2010-35197 A | 2/2010 |
| JP | 2010-104034 A | 5/2010 |
| JP | 2013-534737 A | 9/2013 |
| WO | WO 2010064407 A1 * | 6/2010 |
| WO | WO 2011082828 A1 * | 7/2011 |
| WO | 2011-161887 A1 | 12/2011 |

OTHER PUBLICATIONS

Communication dated Nov. 3, 2014 from the State Intellectual Property Office of People's Republic of China in counterpart application No. 201180030118.3.

3GPP TSG RAN WG1 Meeting #61bis, "Further Discussions on UCI Multiplexing on PUSCH in case of SU-MIMO", Jun. 28-Jul. 2, 2010, R1-104163, Alcatel-Lucent Shanghai Bell, Alcatel-Lucent, 5 pages, Dresden, Germany.

3GPP TSG RAN WG1 Meeting #61bis, "Remaining issues of Multiplexing Schemes of control and data in multi-layer PUSCH transmission", Jun. 28-Jul. 2, 2010, R1-103451, Huawei, 5 pages, Dresden, Germany.

3GPP TSG RAN WG1 Meeting #61bis, "Resource Allocation for UCI on PUSCH", Jun. 28-Jul. 2, 2010, R1-103845, Ericsson, ST-Ericsson, 11 pages, Dresden, Germany.

3GPP TSG RAN WG1 Meeting #61bis, "UCI multiplexing on PUSCH with MIMO transmission", Jun. 28-Jul. 2, 2010, R1-103770, Panasonic, 4 pages, Dresden, Germany.

3GPP TS 36.212 V8.8.0, 3rd Generation Partnership Project; Technical Specification Group Radio Access Network; Evolved Universal Terrestrial Radio Access Network (E-UTRAN); Multiplexing and channel coding (release 8), Dec. 2009, pp. 1-8.

Office Action issued Oct. 29, 2013, by the Japanese Patent Office in corresponding Application No. 2012-523816.

3GPP TSG-RAN WG1 Meeting #62bis, Xi'an, People's Republic of China, Oct. 11-Oct. 15, 2010, "Consideration on beta value in calculation of the number of UCI symbols on PUSCH", R1-105417, NEC Group, 5 pages.

* cited by examiner

COMMUNICATION APPARATUS AND RESOURCE DERIVATION METHOD

CROSS REFERENCE TO RELATED APPLICATIONS

This application is a National Stage of International Application No. PCT/JP2011/064560, filed on Jun. 24, 2011, which claims priority from Japanese Patent Application Nos. 2010-156915, filed on Jul. 9, 2010, and 2010-179449, filed on Aug. 10, 2010, the contents of all of which are incorporated herein by reference in their entirety.

TECHNICAL FIELD

The present invention relates to a technology in mobile communication in which, when quality information or an "acknowledgement" to downlink data is multiplexed and transmitted on a channel for uplink data communication, a mobile unit and a base station independently derive the number of resources that are necessary for satisfying a required transmission quality level without mutual signaling.

BACKGROUND ART

In LTE (Long Term Evolution) of the 3GPP ($3^{rd}$ Generation Partnership Project), HARQ-ACK or a RANK INDICATOR (hereinbelow referred to as "RI") can be transmitted from a UE (User Equipment: mobile unit) to an eNodeB (base station) by a PUSCH that is used in data transmission.

In this explanation, a HARQ-ACK is an acknowledgement that indicates to the eNodeB whether downlink data that was transmitted from the eNodeB has been correctly received by the UE and has the two states of positive acknowledgement and negative acknowledgement.

On the other hand, an RI is an index that represents the rank of the downlink MIMO channel (the direction from the eNodeB to the UE) when performing MIMO (Multiple Input Multiple Output) communication between the UE and eNodeB and is reported to the eNodeB from the UE. The rank represents the number of communication paths that can be spatially multiplexed in MIMO communication, the upper limit being the lesser of the number of transmission antennas and the number of reception antennas that face each other. Each data communication path that has been spatially multiplexed is also referred to as a layer.

In Release 8 (2008 Edition) of LTE, the number of resources required when a UE transmits HARQ-ACK or RI to eNodeB on PSUCH is independently calculated by each UE and eNodeB, and the transceiving of the HARQ-ACK or RI is carried out together with recognition of the multiplexed resources.

By the way, in LTE, uplink resources are managed in two-dimensional space that is made up from a hypothetical frequency axis and time axis to enable similar treatment as downlink resources. In this hypothetical space, the frequency axis is partitioned in subcarrier units (15 kHz), the time axis is partitioned in SC-FDMA symbol units, and this partitioned area (grid) is referred to as resource elements (herein below represented as RE). The above-described number of resources represents the number of these RE.

In Release 8 of LTE, only PUSCH of one-antenna transmission (i.e., non-MIMO) is supported in uplink data transmission. The following Formula 1 is specified for calculating Q', the number of resources that is necessary when transmitting O-bit HARQ-ACK or RI on this PUSCH (Non-Patent Document 1).

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$ [Formula 1]

Formula 1 is described hereinbelow.

The function min( ) on the right side, similar to a typical definition, is a function for selecting the minimum value among arguments.

Of the arguments of the function min( ), the argument of the first item is described.

$M\_sc^{PUSCH}$-Initial represents frequency resources that have been allocated to data (transport block) that are to be transmitted by a PUSCH in units that correspond to subcarriers (i.e., 15 kHz units), and moreover, represents the resources that are allocated at the time of initial transmission to a transport block that is to be transmitted by a PUSCH in which HARQ-ACK or RI is multiplexed (regardless of whether the transmission is an initial transmission or a re-transmission).

Here, initial transmission represents transmission in which the transport block is first transmitted, and retransmission represents transmission in which a transport block is retransmitted when the transport block (data) could not be correctly received at the time of the first transmission in an eNodeB.

$N\_symb^{PUSCH}$-Initial represents the number of SC-FDMA symbols at the time of initial transmission of the transport block.

$K\_r$ represents the number of bits contained in the $r^{th}$ code block (starting from 0) after the transport block has been divided into C code blocks for the purpose of turbo-coding. Accordingly, the denominator of the argument of the first item represents the number of all bits following division of the transport block into code blocks.

In Formula 1, the part obtained by dividing the product of $M\_sc^{PUSCH}$-Initial and $N\_symb^{PUSCH}$-Initial by the denominator can be interpreted as showing the number of resources necessary for transmitting one bit of a transport block after division into code blocks while satisfying required quality.

"O" represents the number of information bits of HARQ-ACK or RI that is multiplexed on the PUSCH.

$\beta\_offset^{PUSCH}$ represents a coefficient (or offset, or factor, or multiplying factor) that is necessary for satisfying transmission quality of HARQ-ACK transmission and RI transmission when the transmission quality of the transport block is taken as a reference, is a value set in advance according to the type of transmission object (HARQ-ACK or RI), and is shared by both the eNodeB and UE. Because the quality required for HARQ-ACK and RI differs, different values can be set.

On the other hand, the argument $4 \cdot M\_sc^{PUSCH}$ of the second item of the min( ) function gives the maximum value of the number of resources that can be allocated to HARQ-ACK and RI on the PUSCH in which HARQ-ACK and RI are actually multiplexed.

LITERATURE OF THE PRIOR ART

Non-Patent Documents

Non-Patent Document 1: 3GPP TS36.212

SUMMARY OF THE INVENTION

Problem to be Solved by the Invention

In LTE-Advanced that is the next generation of LTE, MIMO can be applied to a PUSCH that is an uplink data channel. When MIMO is applied, depending on the rank of the MIMO communication path, one item of data can be send by a PUSCH when the rank is 1 and a plurality of items of data (a transport block) can be sent by a PUSCH when the rank is greater than 1. These data are each encoded when transmitted by the PUSCH and the encoded data are referred to as code words.

However, when MIMO communication is applied to a PUSCH, Formula 1 that is specified in Release 8 can be applied when the number of code words is 1 but cannot be applied, as is, in which when the number of code words is greater than 1. Accordingly, in such cases, the problem arises that the number of resources necessary for transmitting HARQ-ACK or RI cannot be calculated.

A technique in which a plurality of carriers are handled together as a carrier aggregation is introduced in LTE-Advanced. As a result, in such cases, the necessity arises of simultaneously transmitting HARQ-ACK or RI of several times the number of a plurality of carriers, resulting in the problem in which the number of bits of HARQ-ACK or RI becomes voluminous.

It is therefore an object of the present invention to provide a communication apparatus and a resource derivation method that can derive the number of HARQ-ACK resources when multiplexing and transmitting appropriate information, i.e., HARQ-ACK or RI, in a plurality of code words that are transmitted by a PUSCH while mitigating the great increase caused by carrier aggregation and thus solve the above-described problems.

Means for Solving the Problem

The first communication apparatus of the present invention is a communication apparatus that uses one or more code words to transmit or receive appropriate information on a PUSCH, and includes:

a communication unit that transmits or receives the appropriate information; and a control unit;

wherein, assuming that the $i^{th}$ code word CW_i is used alone to transmit the appropriate information, the control unit calculates the number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 2}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, and K_r is the number of bits contained in the $r^{th}$ code block after the transport block has been divided into C code blocks for turbo-encoding; and when the one or more code words are used to transmit the appropriate information, the control unit calculates the number of resources Q' by using the following formula:

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH}\right) \quad \text{Formula 3}$$

where Q_m^UCI is the modulation order of the modulation method of the appropriate information and M_sc^PUSCH is the number of subcarriers allocated to the transport block at the time of transmission of the appropriate information.

The second communication apparatus of the present invention is a communication apparatus that uses one or more code words to transmit or receive appropriate information in PUSCH and includes:

a communication unit that transmits or receives the appropriate information; and a control unit;

wherein, assuming that the $i^{th}$ code word CW_i is used alone to transmit the appropriate information, the control unit calculates the number of resources Q'_i by using the following formula:

$$Q'_i = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right) \quad \text{Formula 4}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, K_r is the number of bits contained in the $r^{th}$ code block after the transport block has been divided into C code blocks for turbo-encoding, and M_sc^PUSCH is the number of subcarriers that are allocated to the transport block at the time of transmission of the appropriate information; and when the one or more code words are used to transmit the appropriate information, the control unit calculates the number of resources Q' by using the following formula:

$$Q' = \max\left(\min(Q'_i), \left\lceil \frac{O}{Q_m^{UCI}} \right\rceil\right) \quad \text{Formula 5}$$

where Q_m^UCI is the modulation order of the modulation method of the appropriate information.

The third communication apparatus of the present invention is a communication apparatus that uses one or more code words to transmit or receive appropriate information on a PUSCH and includes:

a communication unit that transmits or receives the appropriate information; and a control unit;

wherein, assuming that the $i^{th}$ code word CW_i for which transmission quality is poorest is used alone to transmit the appropriate information, the control unit calculates the number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 6}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, and K_r is the number of bits contained in the r$^{th}$ code block after the transport block has been divided into C code blocks for turbo-encoding; and when the one or more code words are used to transmit the appropriate information, the control unit calculates the number of resources Q' by using the following formula:

$$Q' = \max\left(Q'_i \times (\text{number of layers of } CW_i) \div (\text{total number of layers}), \left\lceil \frac{O}{Q_m^{UCI}} \right\rceil \right) \quad \text{Formula 7}$$

where Q_m^UCI is the modulation order of the modulation method of the appropriate information, and M_sc^PUSCH is the number of subcarriers allocated to the transport block at the time of transmission of the appropriate information.

The fourth communication apparatus of the present invention is a communication apparatus that uses one or more code words to transmit or receive appropriate information on a PUSCH and includes:

a communication unit that transmits or receives the appropriate information; and a control unit;

wherein, assuming that the i$^{th}$ code word CW_i is used alone to transmit the appropriate information, the control unit calculates the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil \quad \text{Formula 8}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are coefficients that are set in advance according to the type of the appropriate information, and K_r is the number of bits contained in the r$^{th}$ code block after the transport block has been divided into C code blocks for turbo-encoding; and when the one or more code words are used to transmit the appropriate information, the control unit calculates the number of resources Q' by using the following formula:

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH} \right) \quad \text{Formula 9}$$

where Q_m^UCI is the modulation order of the modulation method of the appropriate information, and M_sc^PUSCH is the number of subcarriers allocated to the transport block at the time of transmission of the appropriate information.

The fifth communication apparatus of the present invention is a communication apparatus that uses one or more code words to transmit or receive appropriate information on a PUSCH and includes:

a communication unit that transmits or receives the appropriate information; and a control unit;

wherein, when it is assumed that the i$^{th}$ code word CW_i is used alone to transmit the appropriate information, the control unit calculates the number of resources Q'_i by using the following formula:

$$Q' = \min\left(\left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil, 4 \cdot M_{sc}^{PUSCH} \right) \quad \text{Formula 10}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are coefficients that are set in advance according to the type of the appropriate information, K_r is the number of bits contained in the r$^{th}$ code block after the transport block has been divided into C code blocks for turbo-encoding, and M_sc^PUSCH is the number of subcarriers that are allocated to the transport block at the time of transmission of the appropriate information; and when the one or more code words are used to transmit the appropriate information, the control unit calculates the number of resources Q' by using the following formula:

$$Q' = \max\left(\min(Q'_i), \left\lceil \frac{O}{Q_m^{UCI}} \right\rceil\right) \quad \text{Formula 11}$$

where Q_m^UCI is the modulation order of the modulation method of the appropriate information.

The sixth communication apparatus of the present invention is a communication apparatus that uses one or more code words to transmit or receive appropriate information on a PUSCH and includes:

a communication unit that transmits or receives the appropriate information; and a control unit;

wherein, assuming that the i$^{th}$ code word CW_i for which transmission quality is the poorest is used alone to transmit the appropriate information, the control unit calculates the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil \quad \text{Formula 12}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are the coefficients that are set in advance according to the type of the appropriate information, and K_r is the number of bits contained in the r^th code block after the transport block has been divided into C code blocks for turbo-encoding; and when the one or more code words are used to transmit the appropriate information, the control unit calculates the number of resources Q' by using the following formula:

$$Q' = \max\left( Q'_i \times (\text{number of layers of } CW_i) \div (\text{total number of layers}), \left\lceil \frac{O}{Q_m^{UCI}} \right\rceil \right) \quad \text{Formula 13}$$

where Q_m^UCI is the modulation order of the modulation method of the appropriate information, and M_sc^PUSCH is the number of subcarriers allocated to the transport block at the time of transmission of the appropriate information.

The first resource derivation method of the present invention is a resource derivation method realized by a communication apparatus that uses one or more code words to transmit or receive appropriate information on a PUSCH, the resource derivation method including steps of:

assuming that the i^th code word CW_i is used alone to transmit the appropriate information, calculating the number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 14}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, and K_r is the number of bits contained in the r^th code block after the transport block has been divided into C code blocks for turbo-encoding; and when the one or more code words are used to transmit the appropriate information, calculating the number of resources Q' by using the following formula:

$$Q' = \min\left( \max\left( \left\lceil \left(\sum_i \frac{1}{Q'_i}\right)^{-1} \right\rceil, \left\lceil \frac{O}{Q_m^{UCI}} \right\rceil \right), 4 \cdot M_{sc}^{PUSCH} \right) \quad \text{Formula 15}$$

where Q_m^UCI is the modulation order of the modulation method of the appropriate information and M_sc^PUSCH is the number of subcarriers allocated to the transport block at the time of transmission of the appropriate information.

The second resource derivation method of the present invention is a resource derivation method realized by a communication apparatus that uses one or more code words to transmit or receive appropriate information on a PUSCH, the resource derivation method including steps of:

assuming that the i^th code word CW_i is used alone to transmit the appropriate information, calculating the number of resources Q'_i by using the following formula:

$$Q'_i = \min\left( \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH} \right) \quad \text{Formula 16}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, K_r is the number of bits contained in the r^th code block after the transport block has been divided into C code blocks for turbo-encoding, and M_sc^PUSCH is the number of subcarriers that are allocated to the transport block at the time of transmission of the appropriate information; and when the one or more code words are used to transmit the appropriate information, calculating the number of resources Q' by using the following formula:

$$Q' = \max\left( \min(Q'_i), \left\lceil \frac{O}{Q_m^{UCI}} \right\rceil \right) \quad \text{Formula 17}$$

where Q_m^UCI is the modulation order of the modulation method of the appropriate information.

The third resource derivation method of the present invention is a resource derivation method realized by a communication apparatus that uses one or more code words to transmit or receive appropriate information on a PUSCH, the resource derivation method including steps of:

assuming that the i^th code word CW_i for which transmission quality is poorest is used alone to transmit the appropriate information, calculating the number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 18}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, β_offset^PUSCH is a coefficient that is set in advance according to the type of the appropriate information, and K_r is the number of bits contained in the r^th code block after the transport block has been divided into C code blocks for turbo-encoding; and when the one or more code words are used to transmit the appropriate information, calculating the number of resources Q' by using the following formula:

$$Q' = \max\left( Q'_i \times (\text{number of layers of } CW_i) \div (\text{total number of layers}), \left\lceil \frac{O}{Q_m^{UCI}} \right\rceil \right) \quad \text{Formula 19}$$

where Q_m^UCI is the modulation order of the modulation method of the appropriate information, and M_sc^PUSCH is the number of subcarriers allocated to the transport block at the time of transmission of the appropriate information.

The fourth resource derivation method of the present invention is a resource derivation method realized by a communication apparatus that uses one or more code words to transmit or receive appropriate information on a PUSCH, the resource derivation method including steps of:

assuming that the i^th code word CW_i is used alone to transmit the appropriate information, calculating the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil \quad \text{Formula 20}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are coefficients that are set in advance according to the type of the appropriate information, and K_r is the number of bits contained in the r^th code block after the transport block has been divided into C code blocks for turbo-encoding; and when the one or more code words are used to transmit the appropriate information, calculating the number of resources Q' by using the following formula:

$$Q' = \min\left( \max\left( \left\lceil \left( \sum_i \frac{1}{Q'_i} \right)^{-1} \right\rceil, \left\lceil \frac{O}{Q_m^{UCI}} \right\rceil \right), 4 \cdot M_{sc}^{PUSCH} \right) \quad \text{Formula 21}$$

where Q_m^UCI is the modulation order of the modulation method of the appropriate information, and M_sc^PUSCH is the number of subcarriers allocated to the transport block at the time of transmission of the appropriate information.

The fifth resource derivation method of the present invention is a resource derivation method realized by a communication apparatus that uses one or more code words to transmit or receive appropriate information on a PUSCH, the resource derivation method including steps of:

assuming that the i^th code word CW_i is used alone to transmit the appropriate information, calculating the number of resources Q'_i by using the following formula:

$$Q' = \min\left( \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil, 4 \cdot M_{sc}^{PUSCH} \right) \quad \text{Formula 22}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are coefficients that are set in advance according to the type of the appropriate information, K_r is the number of bits contained in the r^th code block after the transport block has been divided into C code blocks for turbo-encoding, and M_sc^PUSCH is the number of subcarriers that are allocated to the transport block at the time of transmission of the appropriate information; and when the one or more code words are used to transmit the appropriate information, calculating the number of resources Q' by using the following formula:

$$Q' = \max\left( \min(Q'_i), \left\lceil \frac{O}{Q_m^{UCI}} \right\rceil \right) \quad \text{Formula 23}$$

where Q_m^UCI is the modulation order of the modulation method of the appropriate information.

The sixth resource derivation method of the present invention is a resource derivation method realized by a communication apparatus that uses one or more code words to transmit or receive appropriate information on a PUSCH, the resource derivation method including steps of:

assuming that the i^th code word CW_i for which transmission quality is the poorest is used alone to transmit the appropriate information, calculating the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil \quad \text{Formula 24}$$

where O is the number of information bits of the appropriate information, M_sc^PUSCH-Initial is the number of subcarriers that are allocated to a transport block that is to be transmitted by the PUSCH at the time of initial transmission, N_symb^PUSCH-Initial is the number of symbols that are allocated to the transport block at the time of initial transmission, α, β_offset^PUSCH are coefficients that are set in advance according to the type of the appropriate information, and K_r is the number of bits contained in the $r^{th}$ code block after the transport block has been divided into C code blocks for turbo-encoding; and when the one or more code words are used to transmit the appropriate information, calculating the number of resources Q' by using the following formula:

$$Q' = \max\left( Q_i' \times (\text{number of layers of } CW_i) \div (\text{total number of layers}), \left\lceil \frac{O}{Q_m^{UCI}} \right\rceil \right) \quad \text{Formula 25}$$

where Q_m^UCI is the modulation order of the modulation method of the appropriate information, and M_sc^PUSCH is the number of subcarriers allocated to the transport block at the time of transmission of the appropriate information.

Effect of the Invention

According to the present invention, the effect is obtained in which when appropriate information that is HARQ-ACK or RI is to be multiplexed in a plurality of code words and transmitted on a PUSCH, which is an uplink (in the direction from a UE to an eNodeB) data channel, the number of resources necessary for satisfying an appropriate transmission quality level can be derived.

BEST MODE FOR CARRYING OUT THE INVENTION

An exemplary embodiment of the present invention is next described with reference to the accompanying drawings.

(1) First Exemplary Embodiment

Figure 1:
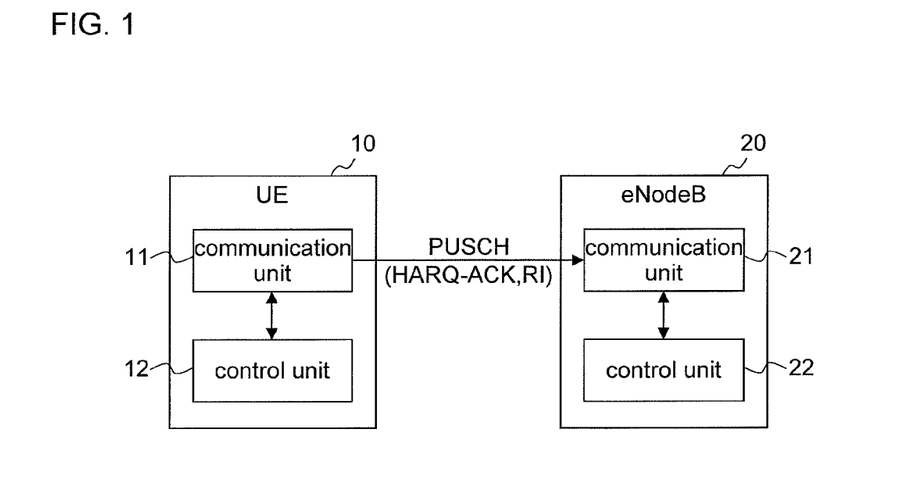
FIG. 1 is a block diagram showing the configuration of the communication system of an exemplary embodiment of the present invention.

Referring to FIG. 1, the communication system of the present exemplary embodiment includes UE 10 and eNodeB 20. Here, UE 10 and eNodeB 20 both correspond to communication apparatuses of the present invention.

The communication system of the present exemplary embodiment is assumed to be an LTE-Advanced communication system in which MIMO is applied to PUSCH, and when UE 10 transmits HARQ-ACK or RI on a PUSCH, one or two code words can be used according to the rank of the MIMO communication path. In addition, one or more layers are allocated to each code word.

UE 10 includes communication unit 11 and control unit 12.

Communication unit 11 is a component that carries out radio communication with eNodeB 20, for example transmitting HARQ-ACK or RI on a PUSCH to eNodeB 20.

Control unit 12 is a component that controls communication unit 11, for example, calculating the number of resources necessary when UE 10 transmits HARQ-ACK or RI on a PUSCH and calculating the number of bits of an HARQ-ACK sequence or RI sequence that is mapped to code words at that time.

Here, a HARQ-ACK sequence refers to a bit string after information elements of HARQ-ACK have been encoded and not to the HARQ-ACK information elements themselves. In addition, an RI sequence refers to a bit string after RI information elements have been encoded, similar to a HARQ-ACK sequence.

eNodeB 20 includes communication unit 21 and control unit 22.

Communication unit 21 is a component that carries out radio communication with UE 10, for example receiving HARQ-ACK or RI that is transmitted in on a PUSCH from UE 10.

Control unit 22 is a component that controls communication unit 21, for example, calculating the number of resources necessary when UE 10 transmits HARQ-ACK or RI on a PUSCH and calculating the number of bits of an HARQ-ACK sequence or RI sequence that are mapped to code words at this time.

When transmitting HARQ-ACK or a RANK INDICATOR by PUSCH, UE 10 and eNodeB 20 of the present exemplary embodiment use Formula 1 to calculate the number of resources when there is one code word.

When there are two code words, UE 10 and eNodeB 20 first use Formula 26 to calculate the number of resources for each code word on the assumption that that code word alone is used to transmit HARQ-ACK or RI.

Then, based on the calculation results, UE 10 and eNodeB 20 calculate the number of resources for a case of transmitting HARQ-ACK or RI using the two code words.

$$Q' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 26}$$

$$Q_{ACK} = (Q_m \cdot L) \cdot Q' \quad \text{Formula 27}$$
$$Q_{RI} = (Q_m \cdot L) \cdot Q'$$

Formula 26 is obtained by only eliminating the upper limit from Formula 1 of Release 8, and is basically identical to Release 8. An upper limit should be applied to the final result and is therefore eliminated in Formula 26.

Formula 27 both gives Q_ACK that is the number of bits of the HARQ-ACK sequence that is transmitted by the code words and gives Q_RI that is the number of bits of the RI sequence that is transmitted by the code words, Q_m is the modulation order of the code words, L is the number of layers that are allocated to the code words, and Q' is a value obtained by substituting an HARQ-ACK parameter or an RI parameter for the code words in Formula 26.

The operations for calculating the number of resources at the time of transmitting HARQ-ACK in UE 10 and eNodeB 20 of the present exemplary embodiment are next described.

As described hereinabove, a case in which MIMO is applied to PUSCH and in which the rank is "3" and the number of code words is "2" (hereinbelow, the two code words are represented as CW1 and CW2) will be described by way of example.

It is here assumed that two layers, layer 1 and layer 2, are allocated to CW1 and a single layer, layer 3, is allocated to CW2 (a total of three layers) and that the same number of resources is allocated to each of the layers that are allocated to code words.

The SNR of layer 1, layer 2, and layer 3 are SNR1, SNR2, and SNR3, respectively.

It is further assumed that when only CW1 is used to transmit HARQ-ACK, the number of resources required in the layers allocated to CW1 (in this case each of layer 1 and layer 2) is Q'_1.

Q'_1 is calculated by applying the parameter of CW1 to Formula 26.

Because it is expected that the parameter of CW1 satisfies the required quality (BLER=BLock Error Rate) in the transmission of CW1, it is expected that by carrying out the transmission of HARQ-ACK with the number of resources represented by Q'_1, this transmission quality will satisfy the required quality.

When HARQ-ACK is transmitted using only CW2, the number of resources required in the layers (in this case, layer 3) that are allocated to CW2 is Q'_2.

Q'_2, similar to the case of CW1, is calculated by applying the parameter of CW2 to Formula 26. With the number of resources represented by Q'_2, the transmission quality of HARQ-ACK is expected to satisfy the required quality similar to the case for CW1.

In the calculation of Formula 26, M_sc^PUSCH-Initial and N_symb^PUSCH-Initial are common to CW1 and CW2. β_offset^PUSCH may differ for CW1 and CW2, but a common value must be used in UE 10 and eNodeB 20. Here, an example is taken up in which β_offset^PUSCH is selected according to the modulation methods of each of CW1 and CW2. UE 10 and eNodeB 20 have common knowledge regarding the modulation method of each code word (because it is reported from eNodeB 20 to UE 10). As a result, UE 10 and eNodeB 20 may share a table such as shown below:

TABLE 1

| Modulation method of each code word | $\beta_{offset}^{PUSCH}$ |
|---|---|
| QPSK | $\beta_{offset\_QPSK}^{PUSCH}$ |
| 16QAM | $\beta_{offset\_16QAM}^{PUSCH}$ |
| 64QAM | $\beta_{offset\_64QAM}^{PUSCH}$ |

As another example of a method of selecting β_offset^PUSCH according to the modulation method of each of CW1 and CW2, β_offset^PUSCH of Formula 26 may be substituted for α×β_offset^PUSCH and the following Formula 28 adopted. The range of α is 0<α≤1. In this case, α is selected for each code word. In addition, α may be selected to match the modulation method of any code word. α may be set in advance in eNodeB 20 and UE 10 as a value that is determined in advance, or may be set to UE 10 from eNodeB 20. In this case, β_offset^PUSCH itself does not depend on the modulation method.

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil \quad \text{Formula 28}$$

TABLE 2

| Modulation method of each code word | α |
|---|---|
| QPSK | 1.0 |
| 16QAM | 0.556 |
| 64QAM | 0.429 |

α in Table 2 represents an example that uses modulation points farthest outside of each modulation method when transmitting HARQ-ACK or RI and employs the ratio of the transmission power of the code words and the transmission power of HARQ-ACK or RI when modulation is implemented by QPSK. α may be optimized according to the required SNR of data in each MCS.

Figure 2:
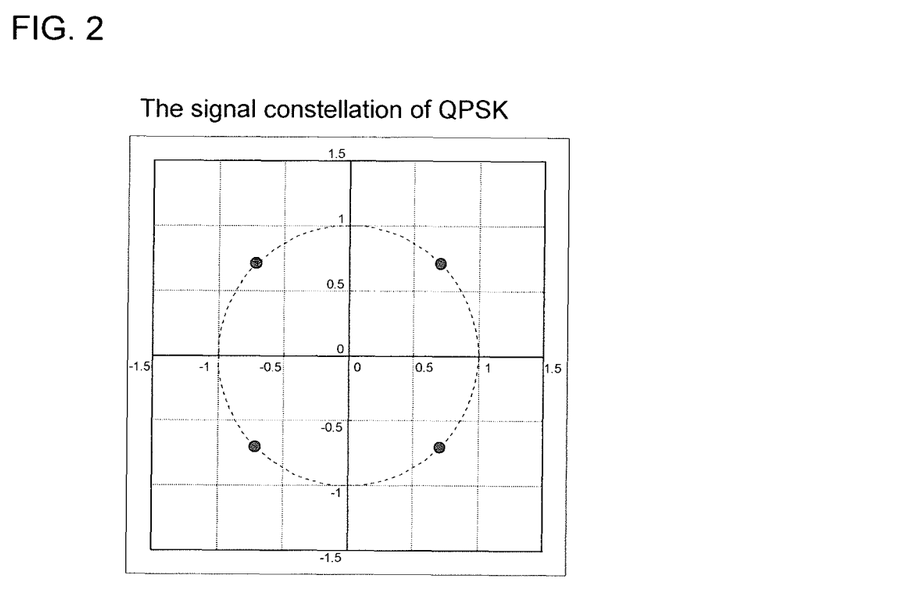
FIG. 2 shows the signal constellation of QPSK.
Figure 3:
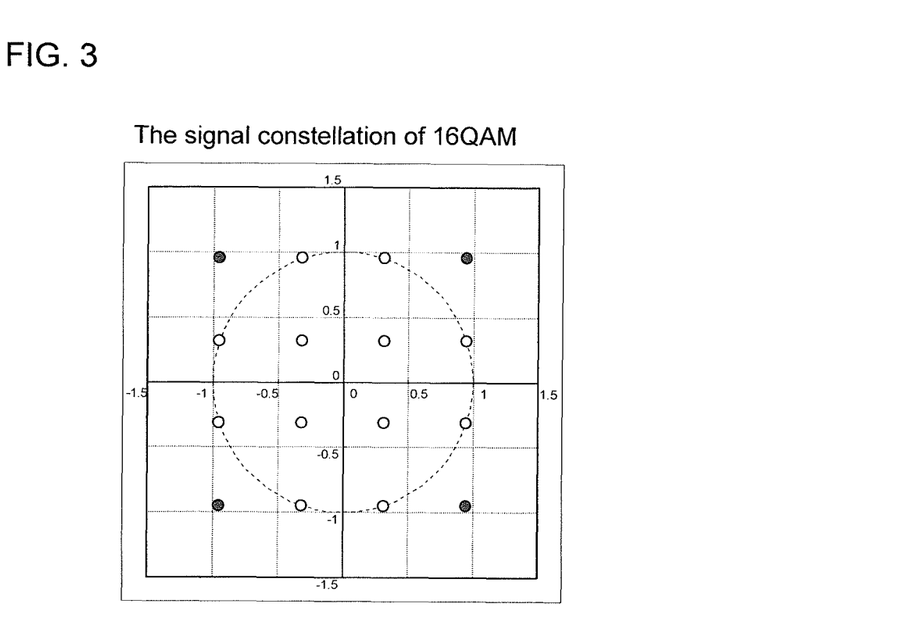
FIG. 3 shows the signal constellation of 16QAM.
Figure 4:
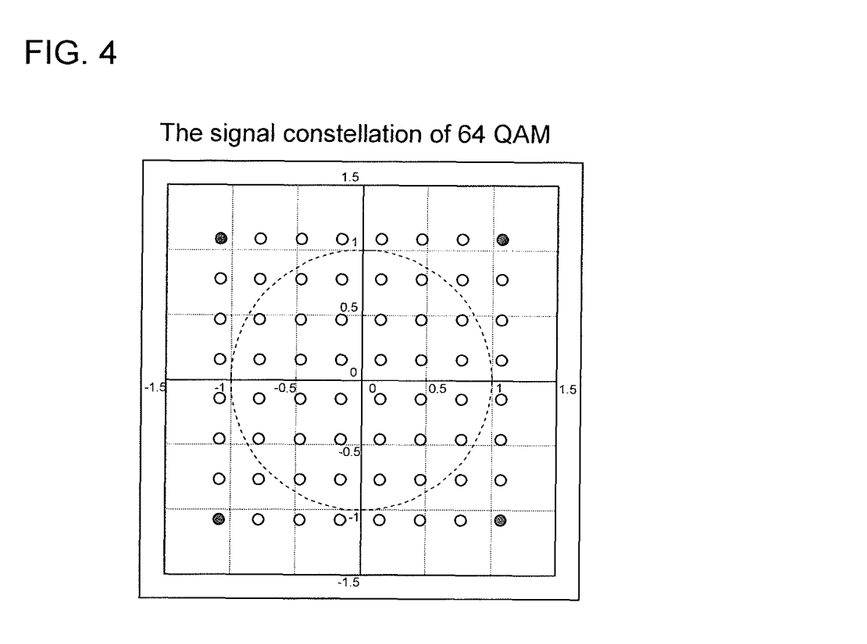
FIG. 4 shows the signal constellation of 64 QAM.

FIG. 2, FIG. 3, and FIG. 4 represent the signal constellations of each of QPSK, 16QAM, and 64QAM, respectively, the average transmission power of all signal points being the same (=1). Referring to each figure, it can be seen that the amplitude of the outermost signal points is greater in the order of QPSK<16QAM<64QAM, even at the same transmission power. Table 2 represents the ratio of the average transmission power (equal to the transmission power of code words) of all signal points and the transmission power of the outermost signal points (equal to the transmission power of HARQ-ACK or RI).

Referring to Table 2, the value of Q' in Formula 28 is reduced by about one-half compared to Formula 26 in the cases of 16QAM or 64QAM. If Q' of RI is reduced, each code word undergoes rate matching by resources that remain after the resources for RI are eliminated from all resources, with the result that the coding rate of each code word decreases (i.e., resulting in an improvement of the error correction capability). If Q' of HARQ-ACK is reduced, the number of bits of each code word that is overwritten by HARQ-ACK is decreased, with the result that the transmission quality of each code word improves.

The substitution of β_offset^PUSCH by α×β_offset^PUSCH can also be applied to Formula 1 of Release 8. In this case, the following Formula 29 is obtained.

$$Q' = \min\left(\left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil, \quad 4 \cdot M_{sc}^{PUSCH}\right) \quad \text{Formula 29}$$

When both CW1 and CW2 are used to transmit HARQ-ACK, the number of resources necessary in each of the layers allocated to CW1 and CW2 (in this case, layer 1, layer 2, and layer 3) is assumed to be Q'_12.

It is here expected that parameters are selected for both CW1 and CW2 to meet the required quality of data transmission. To this end, the SNR obtained for all of the information bits is considered to be identical when only CW1 or when only CW2 is used to transmit HARQ-ACK. Because the identical SNR should be achieved when both CW1 and CW2 are used, the following Formula 30 holds true.

$$Q_{12}' \times (SNR1+SNR2+SNR3) = Q_2' \times SNR3 = Q_1' \times (SNR1+SNR2) \qquad \text{Formula 30}$$

When Q'_12 is solved in this Formula 30, the following Formula 31 is obtained.

$$\begin{aligned} Q_{12}' &= Q_1' \times (SNR1 + SNR2) \div (SNR1 + SNR2 + SNR3) \quad \text{Formula 31} \\ &= Q_1' \times (SNR1 + SNR2) \div \\ &\quad (SNR1 + SNR2 + (Q_1' \times (SNR1 + SNR2) \div Q_2')) \\ &= Q_1' \times Q_2' \times (SNR1 + SNR2) \div \\ &\quad (Q_2' \times (SNR1 + SNR2) + Q_1' \times (SNR1 + SNR2)) \\ &= Q_1' \times Q_2' \div (Q_2' + Q_1') \end{aligned}$$

Regardless of the number of layers allocated to each code word (one or more), the result is identical if the number of code words is two.

In Formula 31, a minimum value is set such that the number of resources does not fall below the number of resources required for information transmission. Further providing a maximum value similar to that of Release 8 obtains Formula 32 that gives the resources required when using two code words to transmit HARQ-ACK or RI.

$$Q_{12}' = \min\left(\max\left(\left\lceil \frac{Q_1' \cdot Q_2'}{Q_1' + Q_2'} \right\rceil, \left\lceil \frac{O}{Q_m^{UCI}} \right\rceil \right), 4 \cdot M_{sc}^{PUSCH} \right) \qquad \text{Formula 32}$$

$$Q_{ACK}^i = (Q_m^i \cdot L^i) \cdot Q_{12}' \text{ for code word } i \qquad \text{Formula 33}$$

In Formula 32, O is the number of information bits of HARQ-ACK or RI and is a value of at least "1." $Q\_m^{UCI}$ represents the modulation order of the modulation method of the HARQ-ACK sequence. For example, even when the modulation method of code words is 16QAM, the modulation method is taken as QPSK when only the outermost modulation points are used, and the modulation order is "2." On a PUSCH in which HARQ-ACK is actually multiplexed, the minimum value of the number of resources that should be allocated to HARQ-ACK or RI is given by the argument of the second item of the max ( ) function, and the maximum value that can be allocated is given by the argument of the second item of the min( ) function.

Formula 33 is the same as Formula 27. When transmitting HARQ-ACK of O bits on a PUSCH, Formula 33 gives the number of bits Q_ACK^i of the HARQ-ACK sequence that should be mapped to the $i^{th}$ (where i={1, 2}) code word i that is used in this transmission.

On the right side, Q_m^i shows the number of bits that can be transmitted by one resource in the modulation method of code word i, Q_m^i being "2" in the case of QPSK, "4" in the case of 16QAM, and "6" in the case of 64QAM. L^i is the number of layers that are allocated to code word i. Q' is the value that is calculated by Formula 32. Q'_1 and Q'_2 of Formula 32 are values that are given by substituting the number of information bits and offset value of HARQ-ACK for O and β_offset^PUSCH of Formula 26.

The process for RI is the same as for HARQ-ACK with the exception that values given by substituting the values used for RI in O and β_offset^PUSCH of Formula 26 are used in Formula 32 and Formula 33.

Formula 32 is typically represented by using the following Formula 34:

$$Q' = \min\left(\max\left(\left\lceil \left(\sum_i \frac{1}{Q_i'}\right)^{-1} \right\rceil, \left\lceil \frac{O}{Q_m^{UCI}} \right\rceil \right), 4 \cdot M_{sc}^{PUSCH} \right) \qquad \text{Formula 34}$$

Here, assuming that HARQ-ACK or RI is being transmitted by only code word i, Q'_i is the number of resources that is given by applying Formula 26 to the code word. Formula 34 is otherwise the same as Formula 32.

In the present exemplary embodiment as described hereinabove, UE 10 and eNodeB 20 are able to calculate the number of resources when a plurality of code words is used to transmit HARQ-ACK or RI on a PUSCH by applying Formula 34.

(2) Second Exemplary Embodiment

Compared to the first exemplary embodiment, the present exemplary embodiment shares the operation of using Formula 27 and Formula 33 to calculate the number of bits of a HARQ-ACK sequence or an RI sequence, but differs regarding the operation of calculating the number of resources. The configuration and operations are otherwise the same as those of the first exemplary embodiment.

The operation of calculating the number of resources at the time of transmission of HARQ-ACK in UE 10 and eNodeB 20 of the present exemplary embodiment is next described using the same example as in the first exemplary embodiment.

Q'_1 and Q'_2 are first calculated, similar to the first exemplary embodiment. However, Formula 1 (the calculation Formula of Release 8 of 3GPP) or Formula 29 is used in the calculation of Q'_1 and Q'_2.

Q'_12 is next calculated by means of the following Formula 35, i.e., Q'_12 is the lesser of Q'_1 and Q'_2 when Q'_1 and Q'_2 are equal to or greater than the minimum value of the number of resources.

$$Q_{12}' = \max\left(\min(Q_1', Q_2'), \left\lceil \frac{O}{Q_m^{UCI}} \right\rceil \right) \qquad \text{Formula 35}$$

For example, when Q'_1 is less than Q'_2, the transmission quality when HARQ-ACK is transmitted using only CW1 by the resources of Q'_1 satisfies the required quality. As a result, also making the number of resources of CW2 Q'_1 enables a further improvement of the transmission quality when HARQ-ACK is transmitted by using only CW2.

On the other hand, when Q'_2 is less than Q'_1, the transmission quality when HARQ-ACK is transmitted using only CW2 by the resources of Q'_2 meets the required quality. As a result, also making the number of resources of CW1 Q'_2 enables a further improvement of the transmission quality when HARQ-ACK is transmitted by using only CW1.

Thus, selecting, of Q'_1 and Q'_2, the value having a lower number of resources enables the transmission quality of HARQ-ACK to satisfy the required quality.

The calculation of the number of resources can be carried out similarly for RI.

Formula 35 is typically represented by using the following Formula 36.

$$Q' = \max\left(\min(Q'_i), \left\lceil \frac{O}{Q_m^{UCI}} \right\rceil \right) \quad \text{Formula 36}$$

Assuming that HARQ-ACK or RI is transmitted by only code word i, Q'_i is the number of resources given by applying Formula 1 or Formula 29 to that code word. Formula 36 is otherwise the same as Formula 35.

In the present exemplary embodiment as described hereinabove, UE 10 and eNodeB 20 are able to calculate the number of resources when using a plurality of code words to transmit HARQ-ACK or RI on a PUSCH by applying Formula 36.

(3) Third Exemplary Embodiment

Compared with the first exemplary embodiment, the present exemplary embodiment shares the operation of using Formula 27 and Formula 33 to calculate the number of bits of a HARQ-ACK sequence or an RI sequence but differs regarding the operation of calculating the number of resources. The configuration and operations are otherwise the same as the first exemplary embodiment.

The operation of calculating the number of resources at the time of transmitting HARQ-ACK in UE 10 and eNodeB 20 of the present exemplary embodiment is next described using the same example as in the first exemplary embodiment.

Similar to the first exemplary embodiment, Formula 26 and Formula 28 are first used to calculate Q'_1 and Q'_2.

For example, when the transmission quality of CW1 is poor, the following Formula 37 is used to calculate Q'_12.

$$Q'_{12} = \max\left(Q'_1 \times (\text{number of layers of } CW1) \div (\text{total number of layers}), \left\lceil \frac{O}{Q_m^{UCI}} \right\rceil\right) \quad \text{Formula 37}$$

On the other hand, when the transmission quality of CW2 is poor, Q'_12 is calculated using the following Formula 38:

$$Q'_{12} = \max\left(Q'_2 \times (\text{number of layers of } CW2) \div (\text{total number of layers}), \left\lceil \frac{O}{Q_m^{UCI}} \right\rceil\right) \quad \text{Formula 38}$$

In the case of LTE, the level of the transmission quality can be determined by the size of the index of the MCS (Modulation and Coding Scheme).

The number of layers of CW1 and CW2 is not limited to this example and can be applied to cases in which the number of layers is one or more.

This method corresponds to a case of applying the transmission quality of the code word having the poorest transmission quality to all layers.

The SNR of the code word having the worst transmission quality is substituted as SNR0 in SNR1, SNR2, and SNR3 of Formula 30.

For example, when the transmission quality of CW1 is poorest, the following Formula 39 is obtained:

$$Q_{12}' \times 3 \times SNR0 = Q_1' \times 2 \times SNR0$$

$$Q_{12}' = Q_1' \times (\tfrac{2}{3}) \quad \text{Formula 39}$$

On the other hand, when the transmission quality of CW2 is poorest, the following Formula 40 is obtained:

$$Q_{12}' \times 3 \times SNR0 = Q_2' \times 2 \times SNR0$$

$$Q_{12}' = Q_2' \times (\tfrac{1}{3}) \quad \text{Formula 40}$$

When the transmission quality of the two code words is equal, the calculation result is the same regardless of which code word is used, and either code word may be used.

Calculating the number of resources for RI can be carried out in the same way.

When the code word having the worst quality is assumed to be CW_i, Formula 37 and Formula 38 are typically represented as the following Formula 41:

$$Q' = \max\left(Q'_i \times (\text{number of layers of } CW_i) \div (\text{total number of layers}), \left\lceil \frac{O}{Q_m^{UCI}} \right\rceil\right) \quad \text{Formula 41}$$

Here, assuming that HARQ-ACK or RI is transmitted by code word i alone, Q'_i is the number of resources given by applying Formula 26 or Formula 28 to that code word. Formula 41 is otherwise the same as Formula 37 and Formula 38.

In the above-described exemplary embodiments, UE 10 and eNodeB 20 are able to calculate the number of resources when using a plurality of code words to transmit HARQ-ACK or RI on a PUSCH by applying Formula 41.

Further, the second exemplary embodiment and the third exemplary embodiment may be combined and Q'_12 having a lower number may be selected.

Although the present invention has been described with reference to exemplary embodiments, the present invention is not limited to the above-described exemplary embodiments. The configuration and details of the present invention is open to a variety of modifications within the scope of the present invention that will be clear to anyone of ordinary skill in the art.

For example, although a case has been described in the present exemplary embodiments in which the number of resources is calculated when transmitting HARQ-ACK or RI from UE 10 to eNodeB 20, the present invention is not limited to this form and may also be applied to a case in which information is transmitted in which the required quality (i.e., BLER) differs from that for data.

Although a case was described in the present exemplary embodiments in which a plurality of code words was used, the present invention is not limited to this form and may be applied to a case in which one code word is used.

This application claims the benefits of priority based on Japanese Patent Application No. 2010-156915 for which application was submitted on Jul. 9, 2010 and Japanese Patent Application No. 2010-179449 for which application was submitted on Aug. 10, 2010, and incorporates by citation all of the disclosures of these applications.

What is claimed is:

1. A communication apparatus that uses one or more code words to transmit or receive appropriate information on a PUSCH, comprising:
   a communication unit that transmits or receives said appropriate information; and
   a control unit;

wherein:
when the i$^{th}$ code word CW_i is used alone to transmit said appropriate information, said control unit calculates a number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, β_offset^PUSCH is a coefficient that is set in advance according to the type of said appropriate information, and K_r is the number of bits contained in the r$^{th}$ code block after said transport block has been divided into C code blocks for turbo-encoding;
when said one or more code words are used to transmit said appropriate information, said control unit calculates a number of resources Q' by using the following formula:

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH}\right)$$

where Q_m^UCI is the modulation order of the modulation method of said appropriate information and M_sc^PUSCH is the number of subcarriers allocated to said transport block at the time of transmission of said appropriate information; and
said communication unit transmits said appropriate information based on the number of resources that is calculated by said control unit.

2. A communication apparatus that uses one or more code words to transmit or receive appropriate information on a PUSCH comprising:
a communication unit that transmits or receives said appropriate information; and
a control unit;
wherein:
when the i$^{th}$ code word CW_i for which transmission quality is poorest is used alone to transmit said appropriate information, said control unit calculates the number of resources Q'_i by using the following formula:

$$Q'_i = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, β_offset^PUSCH is a coefficient that is set in advance according to the type of said appropriate information, and K_r is the number of bits contained in the r$^{th}$ code block after said transport block has been divided into C code blocks for turbo-encoding;
when said one or more code words are used to transmit said appropriate information, said control unit calculates the number of resources Q' by using the following formula:

$$Q' = \max\left(Q'_i \times (\text{number of layers of } CW_i) \div (\text{total number of layers}), \left\lceil \frac{O}{Q_m^{UCI}} \right\rceil\right)$$

where Q_m^UCI is the modulation order of the modulation method of said appropriate information, and M_sc^PUSCH is the number of subcarriers allocated to said transport block at the time of transmission of said appropriate information; and
said communication unit transmits said appropriate information based on the number of resources that is calculated by said control unit.

3. A communication apparatus that uses one or more code words to transmit or receive appropriate information on a PUSCH comprising:
a communication unit that transmits or receives said appropriate information; and
a control unit;
wherein:
when the i$^{th}$ code word CW_i is used alone to transmit said appropriate information, said control unit calculates the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, α, β_offset^PUSCH are coefficients that are set in advance according to the type of said appropriate information, and K_r is the number of bits contained in the r$^{th}$ code block after said transport block has been divided into C code blocks for turbo-encoding;
when said one or more code words are used to transmit said appropriate information, said control unit calculates the number of resources Q' by using the following formula:

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH}\right)$$

where Q_m^UCI is the modulation order of the modulation method of said appropriate information, and M_sc^PUSCH is the number of subcarriers allocated at the time of transmission of said appropriate information to said transport block; and said communication unit transmits said appropriate information based on the number of resources that is calculated by said control unit.

4. A communication apparatus that uses one or more code words to transmit or receive appropriate information on a PUSCH comprising:
a communication unit that transmits or receives said appropriate information; and
a control unit;
wherein:
when the $i^{th}$ code word CW_i for which transmission quality is the poorest is used alone to transmit said appropriate information, said control unit calculates the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, α, β_offset^PUSCH are coefficients that are set in advance according to the type of said appropriate information, and K_r is the number of bits contained in the $r^{th}$ code block after said transport block has been divided into C code blocks for turbo-encoding;
when said one or more code words are used to transmit said appropriate information, said control unit calculates the number of resources Q' by using the following formula:

$Q' = \max$ $\left( Q_i' \times (\text{number of layers of } CW_i) \div (\text{total number of layers}), \left\lceil \frac{O}{Q_m^{UCI}} \right\rceil \right)$ where Q_m^UCI is the modulation order of the modulation method of said appropriate information, and M_sc^PUSCH is the number of subcarriers allocated to said transport block at the time of transmission of said appropriate information; and
said communication unit transmits said appropriate information based on the number of resources that is calculated by said control unit.

5. The communication apparatus as set forth in claim 3, wherein said control unit switches the value of α according to the modulation method of the code word.

6. The communication apparatus as set forth in claim 3, wherein:
said communication apparatus is either of a mobile unit or a base station, and
as α, an appropriate value is shared by said mobile unit and said base station.

7. The communication apparatus as set forth in claim 1, wherein said control unit calculates the number of bits Q^i of said appropriate information that is to be mapped to the $i^{th}$ code word by using the following formula:

$Q^i = (Q_m^i \cdot L^i) \cdot Q'$ where Q_m^i is the number of bits that can be transmitted by one resource by the modulation method of the $i^{th}$ code word, and L^i is the number of layers of the $i^{th}$ code word.

8. A resource derivation method realized by a communication apparatus that uses one or more code words to transmit or receive appropriate information on a PUSCH, said resource derivation method comprising steps of:
when the $i^{th}$ code word CW_i is used alone to transmit said appropriate information, calculating the number of resources Q'_i by using the following formula:

$$Q_i' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, β_offset^PUSCH is a coefficient that is set in advance according to the type of said appropriate information, and K_r is the number of bits contained in the $r^{th}$ code block after said transport block has been divided into C code blocks for turbo-encoding;
when said one or more code words are used to transmit said appropriate information, calculating the number of resources Q' by using the following formula:

$$Q' = \min\left( \max\left( \left\lceil \left( \sum_i \frac{1}{Q_i'} \right)^{-1} \right\rceil, \left\lceil \frac{O}{Q_m^{UCI}} \right\rceil \right), 4 \cdot M_{sc}^{PUSCH} \right)$$

where Q_m^UCI is the modulation order of the modulation method of said appropriate information and M_sc^PUSCH is the number of subcarriers allocated to said transport block at the time of transmission of said appropriate information; and
transmitting said appropriate information based on the number of resources that is calculated.

9. A resource derivation method realized by a communication apparatus that uses one or more code words to transmit or receive appropriate information on a PUSCH, said resource derivation method comprising steps of:
when the $i^{th}$ code word CW_i for which transmission quality is poorest is used alone to transmit said appropriate information, calculating the number of resources Q'_i by using the following formula:

$$Q_i' = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, β_offset^PUSCH is a coefficient that is set in advance according to the type of said appropriate information, and K_r is the number of bits contained in the $r^{th}$ code block after said transport block has been divided into C code blocks for turbo-encoding;

when said one or more code words are used to transmit said appropriate information, calculating the number of resources Q' by using the following formula:

$$Q' = \max\left(Q'_i \times (\text{number of layers of } CW_i) \div (\text{total number of layers}), \left\lceil \frac{O}{Q_m^{UCI}} \right\rceil \right)$$

where Q_m^UCI is the modulation order of the modulation method of said appropriate information, and M_sc^PUSCH is the number of subcarriers allocated to said transport block at the time of transmission of said appropriate information; and transmitting said appropriate information based on the number of resources that is calculated.

10. A resource derivation method realized by a communication apparatus that uses one or more code words to transmit or receive appropriate information on a PUSCH, said resource derivation method comprising steps of:

when the $i^{th}$ code word CW_i is used alone to transmit said appropriate information, calculating the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, α, β_offset^PUSCH are coefficients that are set in advance according to the type of said appropriate information, and K_r is the number of bits contained in the $r^{th}$ code block after said transport block has been divided into C code blocks for turbo-encoding;

when said one or more code words are used to transmit said appropriate information, calculating the number of resources Q' by using the following formula:

$$Q' = \min\left(\max\left(\left[\left(\sum_i \frac{1}{Q'_i}\right)^{-1}\right], \left\lceil \frac{O}{Q_m^{UCI}} \right\rceil\right), 4 \cdot M_{sc}^{PUSCH}\right)$$

where Q_m^UCI is the modulation order of the modulation method of said appropriate information, and M_sc^PUSCH is the number of subcarriers allocated to said transport block at the time of transmission of said appropriate information; and transmitting said appropriate information based on the number of resources that is calculated.

11. A resource derivation method realized by a communication apparatus that uses one or more code words to transmit or receive appropriate information on a PUSCH, said resource derivation method comprising steps of:

when the $i^{th}$ code word CW_i for which transmission quality is the poorest is used alone to transmit said appropriate information, calculating the number of resources Q'_i by using the following formula:

$$Q' = \left\lceil \frac{O \cdot M_{sc}^{PUSCH\text{-}initial} \cdot N_{symb}^{PUSCH\text{-}initial} \cdot \alpha \cdot \beta_{offset}^{PUSCH}}{\sum_{r=0}^{C-1} K_r} \right\rceil$$

where O is the number of information bits of said appropriate information, M_sc^PUSCH-Initial is the number of subcarriers that are allocated to a transport block that is to be transmitted by said PUSCH at the time of initial transmission, N_symb^PUSCH-Initial is the number of symbols that are allocated to said transport block at the time of initial transmission, α, β_offset^PUSCH are coefficients that are set in advance according to the type of said appropriate information, and K_r is the number of bits contained in the $r^{th}$ code block after said transport block has been divided into C code blocks for turbo-encoding;

when said one or more code words are used to transmit said appropriate information, calculating the number of resources Q' by using the following formula:

$$Q' = \max\left(Q'_i \times (\text{number of layers of } CW_i) \div (\text{total number of layers}), \left\lceil \frac{O}{Q_m^{UCI}} \right\rceil \right)$$

where Q_m^UCI is the modulation order of the modulation method of said appropriate information, and M_sc^PUSCH is the number of subcarriers allocated to said transport block at the time of transmission of said appropriate information; and transmitting said appropriate information based on the number of resources that is calculated.

12. The resource derivation method as set forth in claim 10, wherein the value of a is switched according to the modulation method of code words.

13. The resource derivation method as set forth in claim 10, wherein:

said communication apparatus is either a mobile unit or a base station; and as α, a value that is determined in advance is shared by said mobile unit and said base station.

14. The resource derivation method as set forth in claim 8, wherein:

said control unit calculates the number of bits Q^i of said appropriate information that is to be mapped to the $i^{th}$ code word by using the following formula:

$Q^i = (Q_m^i \cdot L^i) \cdot Q'$ where Q_m^i is the number of bits that can be transmitted by one resource by the modulation method of the $i^{th}$ code word, and L^i is the number of layers of the $i^{th}$ code word.

* * * * *